United States Patent [19]

Lundberg et al.

[11] Patent Number: 5,133,225

[45] Date of Patent: * Jul. 28, 1992

[54] ELECTRONIC FOOT PEDAL HAVING IMPROVED BIASING ARRANGEMENT

[75] Inventors: Chester E. Lundberg, Sherwood; Keith A. Neubauer, Milwaukie; Jeffrey L. Davis, Tigard; James G. Honyak, Keizer; Christopher D. Nordeen, Portland, all of Oreg.

[73] Assignee: Williams Controls, Inc., Portland, Oreg.

[ * ] Notice: The portion of the term of this patent subsequent to Dec. 11, 2007 has been disclaimed.

[21] Appl. No.: 641,190

[22] Filed: Jan. 15, 1991

[51] Int. Cl.⁵ .............................................. G05G 1/14
[52] U.S. Cl. ........................................ 74/560; 74/512; 338/153; 200/61.89; 267/272; 267/156
[58] Field of Search ............... 74/560, 561, 512, 513, 74/514; 338/153; 200/61.89; 267/156, 154, 272

[56] References Cited

U.S. PATENT DOCUMENTS

| | | | |
|---|---|---|---|
| 1,099,646 | 6/1914 | Gresser | 267/272 |
| 1,830,441 | 11/1931 | Mulhollen | 74/513 |
| 2,042,202 | 5/1936 | Althouse | 74/513 X |
| 2,379,774 | 7/1945 | Wyer | 338/153 |
| 2,713,820 | 7/1955 | Horii | 267/156 X |
| 2,797,431 | 7/1957 | Loria | 267/156 X |
| 2,934,785 | 5/1960 | Heuer | 267/156 X |
| 4,161,341 | 7/1979 | Reinecke et al. | 74/512 X |
| 4,179,949 | 12/1979 | Hildebrecht | 74/560 X |
| 4,528,590 | 7/1985 | Bisacquino et al. | 338/153 |
| 4,976,166 | 12/1990 | Davis et al. | 74/560 X |

Primary Examiner—David A. Scherbel
Assistant Examiner—Winnie Yip
Attorney, Agent, or Firm—Robert L. Harrington

[57] ABSTRACT

An electronic foot pedal for outputting an electrical signal proportional to the degree a treadle is pivoted. The electronic foot pedal has an improved spring arrangement for yieldably biasing the treadle toward its home position. Dual springs are provided, independently mounted and supplementary to each other. Each spring has an adequate biasing force to urge the treadle to its home position. The springs are of a ribbon-like material that are wound into a flat spiral. The springs are subjected mainly to bending forces and have flexure as the treadle is pivoted to its pivotal limits.

4 Claims, 3 Drawing Sheets

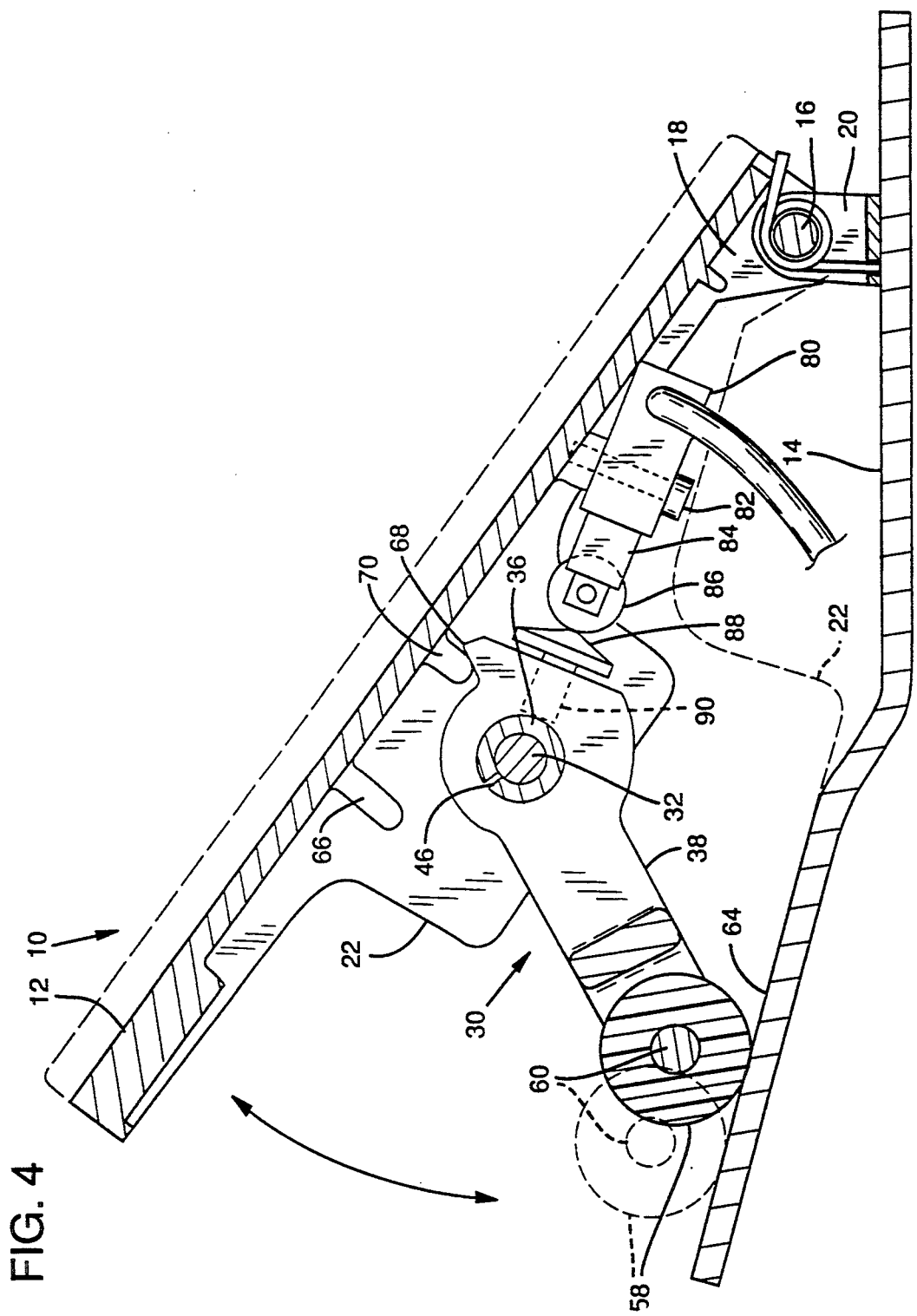

ELECTRONIC FOOT PEDAL HAVING IMPROVED BIASING ARRANGEMENT

BACKGROUND INFORMATION

1. Field of the Invention

This invention relates to electronic foot pedals for outputting electronic signals for controlling engine RPM and in particular it relates to an improved biasing arrangement for yieldably biasing a treadle toward a home position.

2. Background of the Invention

Modern engines for trucks utilize electronic foot pedals that output a signal proportional to treadle displacement. The signal is input to an engine controller which controls, as one of its functions, the speed of the engine.

The electronic foot pedals are self contained, requiring only an electrical connection between the pedal and the engine controller. The electronic foot pedal has a treadle that is pivotally mounted to a base with the treadle biased toward a home position by springs. To provide a safety factor and also to comply with DOT requirements, the electronic foot pedal has dual biasing springs to pivotally bias the treadle toward the home position. Two springs are provided in the event one of the springs fail. The springs are supplementary yet each spring has an adequate biasing force to pivot the treadle to its home position.

Many electronic foot pedals have a pivot arm or member disposed between the treadle and base to provide a multiplier effect for rotating a potentiometer more degrees than the treadle is pivoted. This provides a signal having a finer resolution.

The springs are often coiled wires, with one of the springs of a smaller diameter and nested inside of the other or springs of equal size mounted side by side. Each of the springs have a straight section extending from each end of its coil.

The springs are interposed between a treadle and a base or between the treadle and the pivot arm for example with the ends of the springs extending from one end of the coils exerting a force against the treadle and the ends extending from the opposite end of the coils exerting a force against the base (either directly or through the pivot arm). The force exerted by the springs against the base and the treadle thus provide a yieldable biasing force to urge the treadle to pivot away from the base.

It has been found that when the springs fail, it is almost always at the juncture where the straight section blends with the curved section of the coil. The straight sections extending from the coil of the springs are subject to a bending force rather than a tensile force. The force applied to the end of the extended straight section is near normal to the longitudinal axis of the spring. The straight section of the spring extending from the coil acts as a lever arm and the force applied to the end of the straight section thus tends to force a bending of the spring at the juncture of the straight section with the curved section of the coil. The spring experiences its greatest flexure in this area. This is one of the reasons that most of the breakage of springs occurs in this area.

The force applied to the coiled portion of the spring tends to wind the coil tighter. This force is distributed substantially over the mass of the effected portion of the spring and the larger the mass the less likelihood of failure. However the spring mass of a wire coiled spring has a practical limit imposed by the available space and in particular by the width of the pedal's treadle.

It is therefore an object of the present invention to reduce spring failure by providing a spring biasing means that is not subject to the torsional bending moment experienced by the coiled springs and also provides a greater mass of spring material within the available space.

BRIEF SUMMARY OF THE INVENTION

A preferred embodiment of the present invention is an electronic foot pedal for generating an electrical signal proportional to the degree a treadle is pivoted relative to a base. The electronic foot pedal has a pivot arm pivotally mounted to the treadle and disposed between the treadle and base. A roller end of the pivot arm is in contact with a track portion of the base. A pair of spirally wound clock type springs yieldably bias the treadle to pivot toward a home position. The springs are individually mounted relative to the treadle and pivot arm to exert a force to urge the pivoting of the pivot arm away from the treadle, and the pivot arm in contact with the base thus urges the pivoting of the treadle away from the base. The springs are supplemental to each other yet each has an adequate biasing force to pivot the treadle to its home position. The clock type springs in the spiral configuration are subject to bending forces distributed over a large cross sectional area and have a larger mass as compared to the wire coiled springs. The spirally wound configuration of the clock type springs provides a uniform bending of the spring along its spiral length to minimize the degree of fatiguing flexure as the treadle is pivoted between its pivotal limits. An idle validation switch coupled to the pivotal movement of the treadle is provided as a back up in the event an in-range electrical fault occurs. The idle validation signal provided by the switch overrides the signal from the potentiometer circuit.

BRIEF DESCRIPTION OF THE DRAWINGS

FIG. 3 is a perspective view of a pivot arm used in the electronic foot pedal of FIG. 1; and FIG. 4 is a view of an idle validation switch mounted on the electronic foot pedal.

DESCRIPTION OF THE PREFERRED EMBODIMENT

Figure 1:
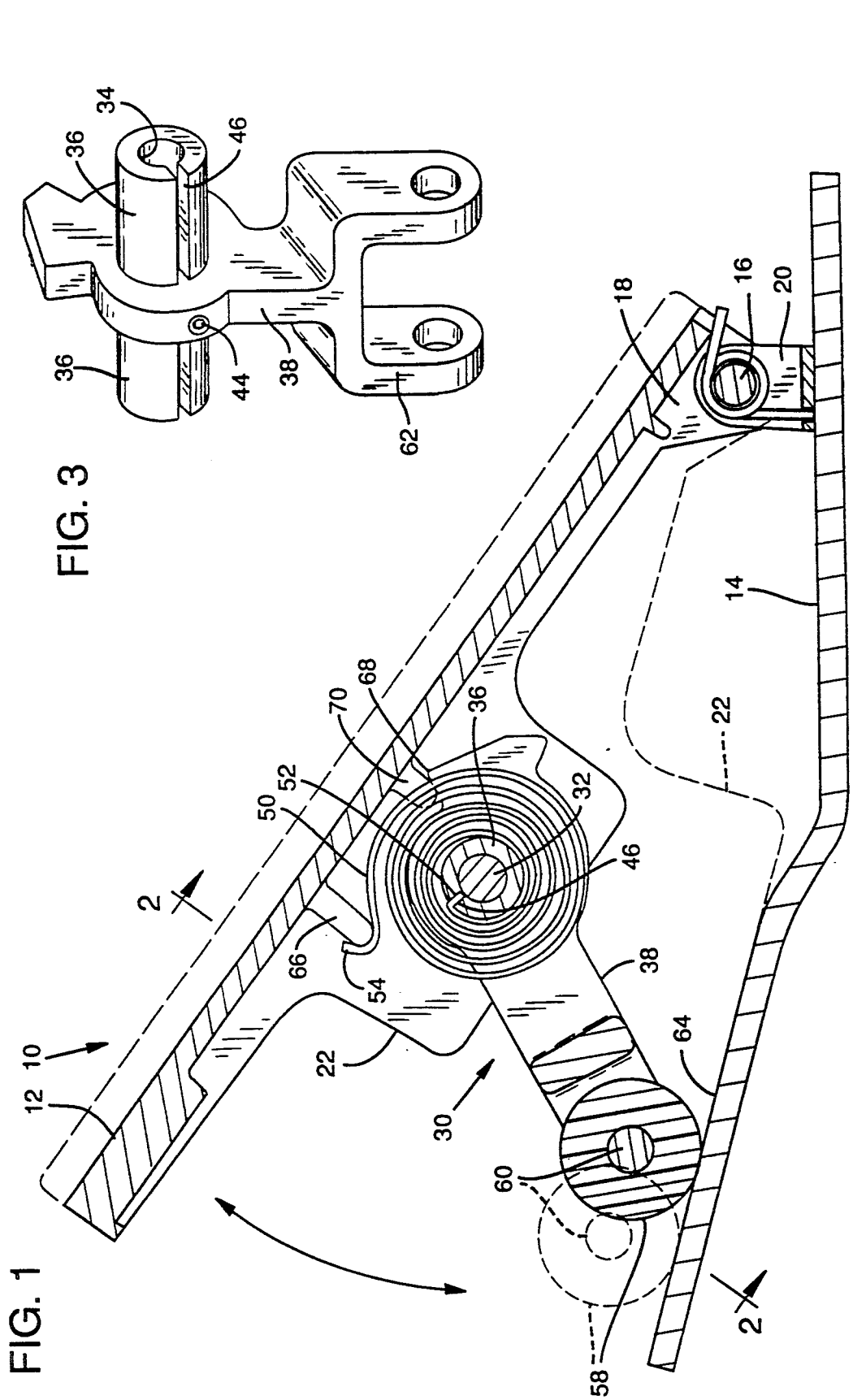
FIG. 1 is a side view, partially in section, of an electronic foot pedal in accordance with the present invention.

A preferred embodiment of an electronic foot pedal 10 is illustrated in FIG. 1. The electronic foot pedal 10 is a self contained unit requiring only an electrical connection to an engine controller. The electronic foot pedal 10 provides a signal for controlling speed of a vehicle engine, such as an engine of an over-the-road tractor. The electronic foot pedal 10 outputs an electrical signal to the engine controller that is proportional to the degree a treadle 12 is pivoted relative to a base 14.

As shown, the treadle 12 is pivotally mounted to the base 14 by a pivot shaft 16. The treadle 12 has depending lugs 18 that fit cooperatively with a "U" shaped bracket 20 of the base 14. The lugs 18 and bracket 20 are suitably bored for receiving the pivot shaft 16. The base 14 is suited for mounting the electronic foot pedal 10 to a support structure such as the floor of the operators compartment of an over-the-road tractor.

The treadle 12 has depending projections 22 and 24 (best seen in FIG. 2), projection 22 extending from one side and projection 24 from the other side. Projections 22 and 24 are in a spaced relation and have aligned bores, projection 22 being bored to receive a bearing 26 and projection 24 being bored for receiving a bushing 28. The projections 22 and 24 provide structure for pivotally mounting a pivot arm 30 to the treadle 12.

Figure 2:
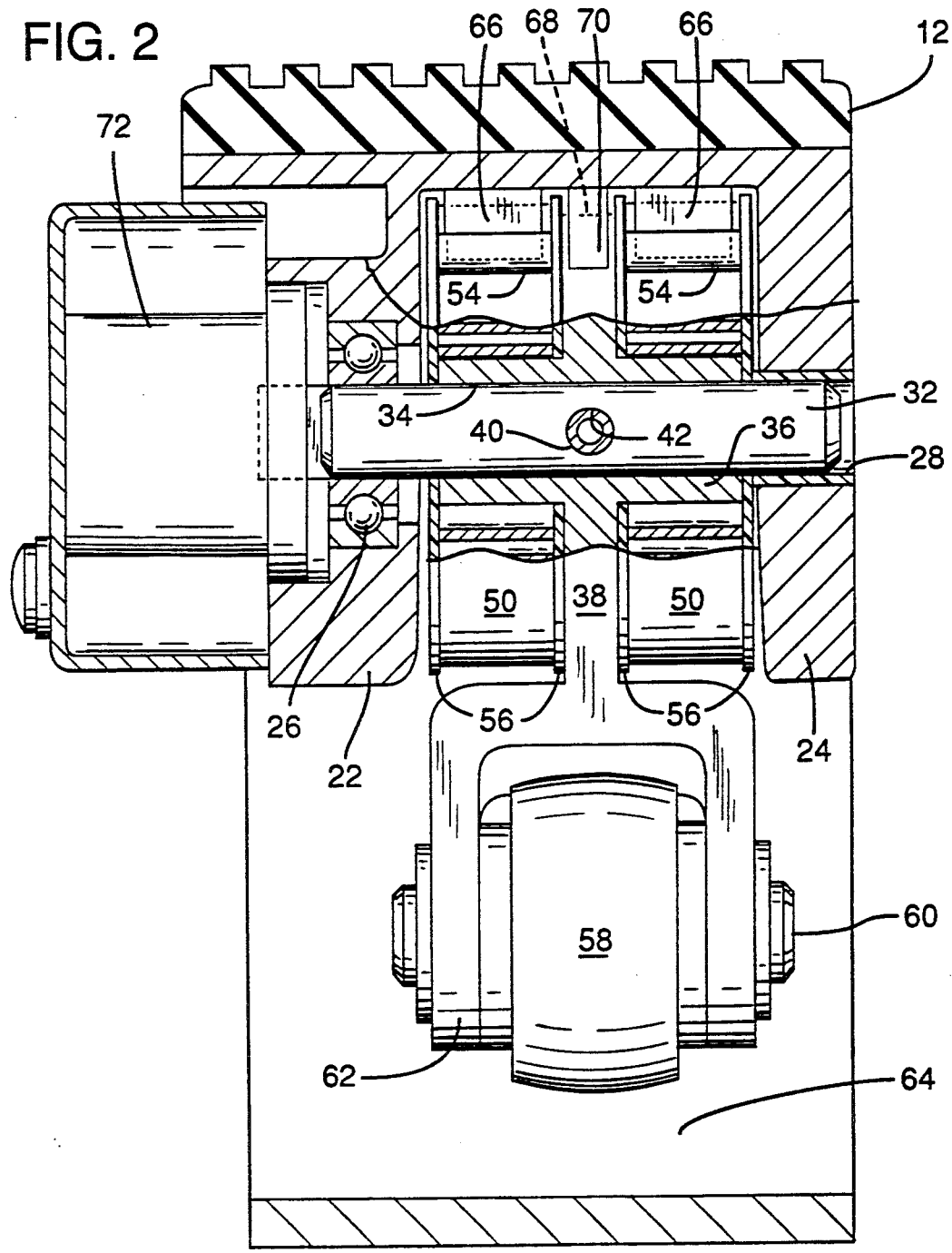
FIG. 2 is a view along view lines 2—2 of FIG. 1.

The pivot arm 30 is fitted between the projections 22 and 24 and is pivotally mounted to the underside of the treadle as shown in FIGS. 1 and 2 by a shaft 32 affixed to the pivot arm 30 fitting in the bearing 26 and bushing 28. The pivot arm 30 is disposed between the treadle 12 and the base 14 with a roller 58 of the arm 30 in contact with an inclined track portion 64 of the base 14. The pivot arm 30 is urged to pivot away from the treadle 12 by springs 50 which in turn urges the treadle 12 to pivot away from the base 14.

Each spring 50, which is mounted in a preloaded condition, has an end 54 in engagement with a post 66 projecting from the treadle 12, and the opposite end 52 of each spring is in engagement with a slot 46 of the pivot arm 30. The springs 50 thus provide a yieldable biasing force to urge the roller end of the pivot arm 30 to pivot away from the treadle 12. The pivotal motion of the pivot arm 30 (in the direction urged by the springs 50) relative to the treadle 12 is limited by an end 68 of the beam 38 of the pivot arm 30 abutting a limit stop 70 extending from the treadle 12. The springs 50 mounted on the pivot arm 30 are supplemental to each other yet each spring has, in the absence of an external force such as an operator's foot depressing the treadle 12 in normal operation, an adequate biasing force to urge the pivotal movement of the pivot arm 30 and thus the treadle 12 to its home position. Note that the home position for the treadle 12 is designated as the position where end 68 is in abutment with the stop 70 and the roller 58 is in contact with the track portion 64 of the base 14. It is evident that the treadle 12 may be pivoted further thus lifting the roller 58 off the track portion 64. This capability is utilized for assembly or for making repairs. The treadle 12 is of course urged toward the home position by the spring or springs 50 urging the pivot arm 30 to pivot away from the treadle 12 with the roller 58 in rolling contact with the track 64. As the roller 58 moves on the track, the treadle 12 is forced to pivot in a direction away from the base 14.

The pivot arm 30 is further illustrated in FIG. 3. The shaft 32 is fitted in a through bore 34 that extends through a cylindrical housing 36 and center beam 38 of the arm 30. The housing 36 as shown is transverse to and extends on each side of the beam 38. The shaft 32 is affixed to the pivot arm 30 by a pin 40, such as a roll pin. A cross bore 42 in the shaft 32 is alignable with a bore 44 that extends through the beam 38 (and bore 34), the bore 42 being normal to the bore 34. The pin 40 is pressed into the aligned bores 42, 44 to fixedly mount the shaft 32 to the pivot arm 30.

A flat spirally wound "clock" type return spring 50 of a flat ribbon-like material, preferably of spring steel, is mounted on each side of the beam 38 on the housing 36. An end 52 of the spring is in engagement with a slot 46 provided along the longitudinal length of the housing 36. Protective washers 56 loosely mountable on the housing 36 are provided on each side of the spring 50.

A crowned roller 58 is rotatably mounted on a shaft 60 fitting in aligned bores of a clevis type bracket 62 at an end of the beam 38.

Referring once again to FIG. 1, which illustrates the assembled electronic foot pedal 10, the pivot arm 30 is pivotally mounted to the treadle 12 and is disposed between the treadle 12 and the base 14. As shown, the roller 58 of the arm 30 is in contact with an inclined track portion 64 of the base 14. A potentiometer 72 (see FIG. 2) is adjustably mounted to the treadle 12 and has a moveable member (not shown) coupled to the pivot shaft 32. As the treadle 12 is pivoted relative to the base 14, either toward or away from, the pivot arm 30 is pivoted relative to the treadle 12 by the roller 58 moving on the inclined track portion 64 of the base 14. This causes the pivot shaft 32 to rotate relative to the treadle 12 and being coupled to the potentiometer 72 (shown in FIG. 2) rotates the moveable member of the potentiometer the same degree as the shaft 32 is rotated to change the output signal. The electronic foot pedal 10 has mechanism that outputs a signal that is proportional to the displacement or movement of a moveable member. The moveable member usually referenced is the treadle 12 (pivotally mounted and moveable), however the signal is also proportional to the displacement of the pivot arm 30 (pivotally mounted and moveable) and to the displacement of the moveable member of the potentiometer.

The biasing springs 50, as previously mentioned are spirally wound springs. In effect the springs 50 are wound around the housing 36. Thus as the arm 30 is pivoted toward or away from the treadle 12, the springs undergo a change in their positional attitude. That is, as the arm 30 is pivoted toward the treadle 12, the spring is wound into a tighter spiral by the rotation of the housing 36 relative to the treadle and when the pivot arm 30 is pivoted away from the treadle 12 the spiral spring unwinds, i.e. the spiral of the spring 50 enlarges. Recall that each spring 50 is assembled and anchored to the electronic foot pedal 10 in a preloaded condition with end 52 of the spring 50 fitting in slot 46 of the housing 36 and end 54 of the spring 50 engaging the post 66 on treadle 12.

The biasing spring 50 in order to be more tightly wound must be deformed, that is it must bend. The converse is also true, as the spiral enlarges (unwinds) the springs are subject to reverse bending or un-bending. The flexing or bending effect, as is known, for a spirally wound clock-type spring is basically distributed along the length of the spiral. The degree of bending at any section along the length of the spiral is thus minimal with respect to the inherent elastic limit of the spring. The minimal flexing or bending of the spring 50 in use thus promotes its longevity.

FIG. 4 illustrates an electronic foot pedal 10 having an idle validation switch 80 fixedly installed to the underside of the treadle 12. The switch 80 is a single pole-single throw switch. One side of the switch functions to provide a logic signal which validates idle operation only. The other side of the switch validates throttle operation. The switch 80 is interconnected to the movement of the treadle 12 such that the initial movement of the treadle changes the switch position from idle validation to throttle validation. The switch transition points are defined by the engine manufacturer and therefor adjustability of the transition point is provided.

The switch 80 in addition to providing a smooth transition from idle mode to throttle mode provides a back up in the event of an electrical fault occurring that produces an unwanted throttle condition, such as a non-demanded acceleration of the engine.

Upon the occurrence of an in-range electrical fault, the operator may return to the idle mode by merely releasing the treadle 12. The return springs 50 pivot the treadle 12 to the home position activating the switch 80 to provide an idle validation signal. The idle validation signal overrides the signal from the potentiometer circuit, regardless of amplitude.

As shown in FIG. 4, the switch 80 is fixedly mounted to the underside of the treadle 12 by fasteners 82.

The switch 80 has a moveable plunger 84 for activating the switch 80 in a conventional manner. The plunger 84 is spring biased to move outwardly from the switch 80. A roller 86 is rotatably mounted on the end of the plunger and is in contact with a cam surface 88 provided on an adjusting screw 90. The adjusting screw 90, which is preferably of the self-locking type, is threadably installed in a threaded bore of the pivot ar 30.

The adjusting screw 90 provides adjustment for the activation of the switch 80 by moving the cam surface 88 relative to the roller 86 on plunger 84.

As the treadle 12 is pivoted from its home position toward the base 14, the pivot arm 30 is pivoted and as a result the cam surface 88 is moved relative to the roller 86 on plunger 84. The roller 86 is urged against the cam surface 88 by the biasing force urging the plunger to move outwardly from the switch 80. As the roller 86 follows the cam surface 88, the plunger 84 moves outwardly, and the switch 80 will be activated to change from idle validation to throttle operation mode.

As the treadle 12 is pivoted toward the home position, the cam surface 88 acting on the roller 86 will be forcing the plunger 84 toward the switch to activate the switch to change from throttle operation to idle validation mode.

While a preferred embodiment of an electronic foot pedal is described and illustrated, it will be apparent to those skilled in the art that variations are possible without departing from the true spirit and scope of the invention. The electronic foot pedal for example may have the pivot arm pivotally mounted to the base with a roller end in contact with the treadle. The potentiometer would be adjustable mounted to the base and relative to the pivotal axis of the arm. The biasing springs then would be coupled directly between the arm and the base. An electronic foot pedal may also be constructed without the utilization of a pivot arm. The biasing springs would be coupled directly to the treadle and base, preferably at the pivot axis with the potentiometer coupled at the pivot axis.

The invention is therefore not to be limited to embodiments described and illustrated but is to be determined by the appended claims.

What is claimed is:

1. An electronic foot pedal for outputting an electrical signal for controlling speed of a vehicle engine, comprising:

a base, a treadle pivotally moveable between a first position and a second position relative to the base, a member coupled to said treadle and responsive to pivotal movement of said treadle for outputting a varying signal proportional to the movement of said treadle between said first and second positions, and a pair of clock type springs of flat spirally wound ribbon-like material, each spring individually mounted for biasing said treadle toward said first position, said springs each being characterized by uniform bending of the spring along its spiral length to minimize the degree of fatiguing flexure as the treadle is pivoted between the first and second positions.

2. An electronic foot pedal as defined in claim 1, and further including;

a pivot arm extending between said treadle and said base and a pivot shaft pivotally connecting one end of said pivot arm to one of said treadle and said base with the other end slidably engaging the other of said treadle and said base, said pair of springs surrounding said pivot shaft in side by side relation and each spring having one end anchored to said one of said treadle and said base whereby movement of the treadle towards the base forces pivoting of said pivot arm and increased winding of said springs.

3. An electronic foot pedal as defined in claim 2, wherein:

said springs are mounted independent but supplemental one to the other, each spring being characterized with sufficient return biasing force to return the treadle to the first position when not subject to operator treadle pressure.

4. An electronic foot pedal as defined in claim 3, including;

a stop member to limit unwinding of the springs and to establish the first position, said springs being in a preloaded condition at said first position.

* * * * *